(12) United States Patent
Moosavi et al.

(10) Patent No.: US 8,565,736 B2
(45) Date of Patent: Oct. 22, 2013

(54) WIRELESS COMMUNICATION DEVICE AND REMOTE USER INTERFACE DEVICE WITH AUTOMATIC DISCONNECT APPARATUS AND METHOD

(75) Inventors: Vahid Moosavi, Kitchener (CA); Sean Elliott Wilson, Kitchener (CA); Kevin Howard Orr, Elmira (CA)

(73) Assignee: BlackBerry Limited, Waterloo, Ontario (CA)

( * ) Notice: Subject to any disclaimer, the term of this patent is extended or adjusted under 35 U.S.C. 154(b) by 163 days.

(21) Appl. No.: 13/118,725

(22) Filed: May 31, 2011

(65) Prior Publication Data

US 2012/0309388 A1   Dec. 6, 2012

(51) Int. Cl.
*H04W 4/00* (2009.01)

(52) U.S. Cl.
USPC .................. 455/414.1; 455/456.1; 455/412.1; 455/426.1

(58) Field of Classification Search
USPC ............. 455/412.1, 414.1, 414.2, 424, 432.3, 455/434, 450, 456.1, 456.2, 456.3, 456.6, 455/457, 459, 550.1, 552.1, 556.1, 557, 455/522, 571, 574, 13.4, 68, 426.1; 340/870.01, 870.07, 854.5, 252
See application file for complete search history.

(56) References Cited

U.S. PATENT DOCUMENTS

| | | | |
|---|---|---|---|
| 7,079,015 B2 | 7/2006 | Gibeau | |
| 2004/0203554 A1* | 10/2004 | Simon | 455/345 |
| 2005/0255874 A1 | 11/2005 | Stewart-Baxter et al. | |
| 2006/0119508 A1* | 6/2006 | Miller | 342/357.17 |
| 2009/0191922 A1 | 7/2009 | Rokusek et al. | |
| 2010/0023204 A1 | 1/2010 | Basir et al. | |
| 2010/0144277 A1* | 6/2010 | Hsieh | 455/41.3 |
| 2011/0171909 A1* | 7/2011 | Jung et al. | 455/41.2 |
| 2012/0296603 A1* | 11/2012 | Kulik et al. | 702/160 |

OTHER PUBLICATIONS

Sorrentino, Andrea, Extended European Search Report for EP 11168312.4, Oct. 25, 2011.
Quick Start Guide—motorola Portable Bluetooth Hands-Free Speaker T305, Guide Number: 6809503A47-A, published 2006.
Amazon.com; Product Description—Tritton AX Visor Bluetooth handsfree car kit, retrieved online at "http://www.amazon.com/Tritton-Technologies-TRI-BC200-Universal-Bluetooth/dp/B001922K9C" on Dec. 12, 2011.
Mae Kowalke, "Gadgets—Product Review: Tritton AXVisor Bluetooth Hands-free Kit", TMCnet, published Aug. 4, 2008.
Sorrentino, Andrea , First Exam Report for EP 11168312.4, May 14, 2013.

* cited by examiner

*Primary Examiner* — Jean Gelin
(74) *Attorney, Agent, or Firm* — Integral Intellectual Property Inc.; Miriam Paton

(57) ABSTRACT

A portable communication device, such as a cellular telephone, communicates via a wireless communication link with a remote user interface device, such as a hands-free interface. The portable communication device and the remote user interface device each comprises a motion sensor, by which each device can determine motion of the device with respect to the earth. The devices may share, via the wireless communication link, motion messages. The wireless communication link may be terminated as a function of the motion of the devices. After the wireless communication link is terminated, the remote user interface device may automatically enter a low-power mode.

4 Claims, 3 Drawing Sheets

WIRELESS COMMUNICATION DEVICE AND REMOTE USER INTERFACE DEVICE WITH AUTOMATIC DISCONNECT APPARATUS AND METHOD

TECHNICAL FIELD

The present disclosure relates generally to portable wireless communication devices, such as cellular telephones, and more particularly the use of such communication devices linked wirelessly to a remote user interface device.

BACKGROUND

Portable communication devices, such as cellular telephones, are in common use. Wireless communication devices such as cellular telephones enjoy the convenience of portability. Experience has shown that some users choose to operate a wireless communication device while driving an automobile. Some forms of operation have drawn criticism, citing concerns such as the user using one hand to hold the phone against an ear, thereby making driving an automobile difficult and potentially hazardous, because the hand used for the cellular telephone is not available to operate other controls of the motor vehicle. Dialing a number in a cellular telephone is another commonly expressed concern, in that dialing may be distracting to the driver.

Remote user interface devices have been developed to facilitate a driver's use of a cellular telephone, while still having both hands available to operate the motor vehicle. Such devices may be clipped to the sun visor or other component of the motor vehicle (some may even be "built-in" to the motor vehicle) in a location in which the user may both speak into the device and hear sounds emitted from a speaker therein. The remote user interface device contains a transceiver that wirelessly interfaces with the cellular telephone by a communication protocol, such as, for example, the IEEE standard 802.11 or 802.15.1—2002 (one implementation of which is the Bluetooth® wireless technology developed by Bluetooth SIG, Inc., Bellevue, Wash., U.S.A.). While the cellular telephone is within range, any incoming call utilizes the remote user interface device to communicate with the driver. That is, the audio received by the cellular telephone via the cellular network is fed through a speaker in the remote device for hearing by the driver. When the driver speaks, a microphone in the remote device speaker receives that sound and transmits an audio signal via the wireless link to the cellular telephone for relaying onto the cellular network.

DETAILED DESCRIPTION

Figure 1:
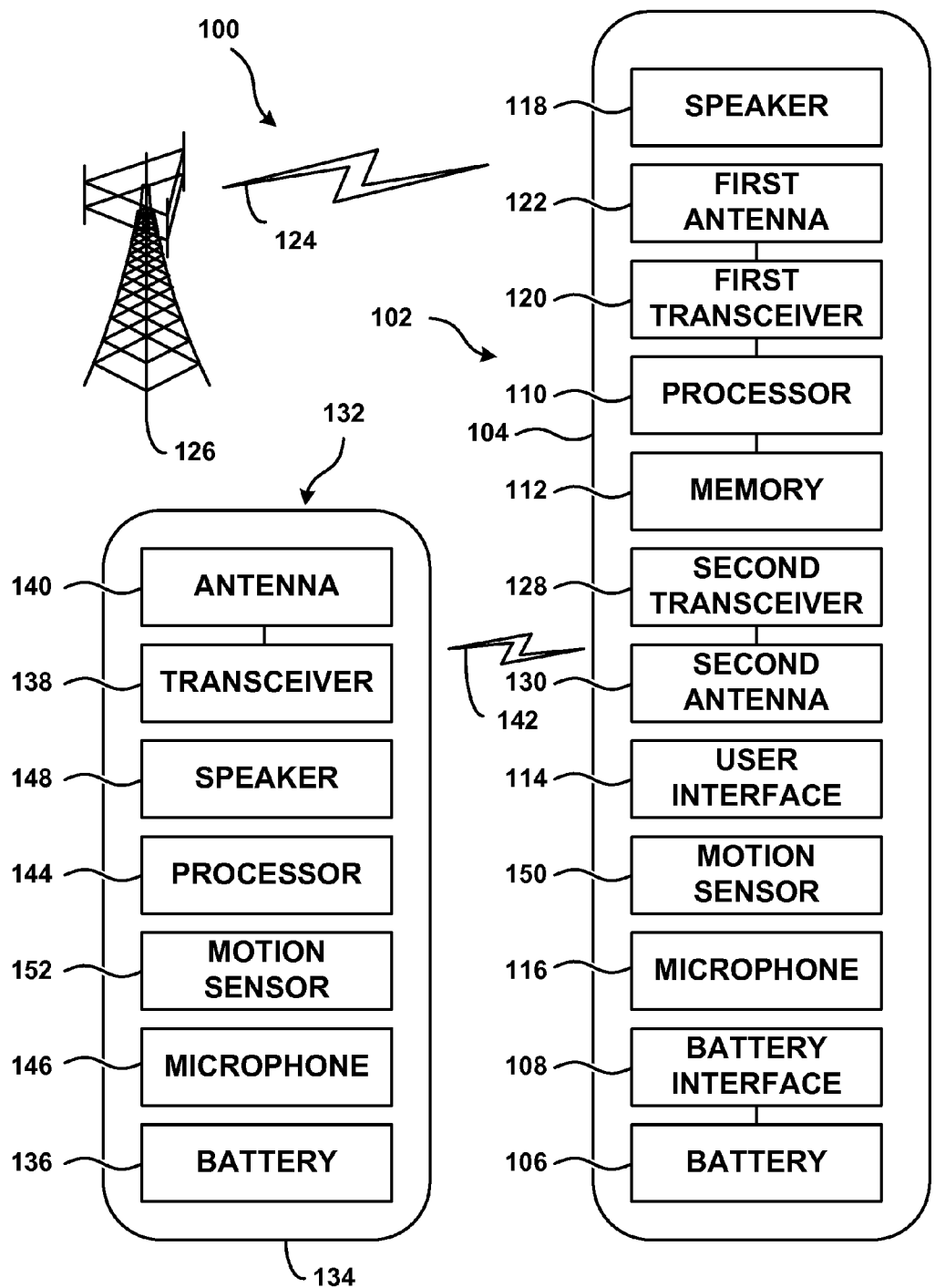
FIG. 1 is a block diagram of a wireless communication system that has a portable communication device and a remote user interface device.

Many remote user interface devices (typically those that are not "built-in" to the motor vehicle) are powered by a power supply (such as a rechargeable battery) that is independent of the motor vehicle. As a result, such remote user interface devices may not automatically turn off (or otherwise enter a low-power mode) when the vehicle ignition switch is in the off position. As a consequence, the power stored in the power supply of the remote user interface device may be consumed unnecessarily if the driver forgets to separately turn off the remote user interface device upon exiting the vehicle.

Another concern may occur when, after parking a vehicle with the remote user interface device left on, the cellular telephone remains within range of the remote user interface device. This can occur, for example, when the vehicle is parked in a garage attached to the user's house and although the user takes the cellular telephone inside the house, the cellular telephone is still within range of the remote user interface device. The communication link between those two devices can remain in effect and incoming telephone calls may continue to be routed by the cellular phone to the unattended remote user interface device in the vehicle. Not only can such a scenario result in an unnecessary consumption of power in the remote user interface device's power supply (which may be but need not be independent of the motor vehicle), there can also be inconvenience to the user as cellular communications may be diverted from the cellular telephone to the remote user interface device.

The present system includes a wireless portable communication device, such as but not limited to, cellular telephones and smart phones. The portable communication device may be handheld, that is, sized to be held or carried in a human hand. The wireless portable communication device may include two wireless communication transceivers: a conventional cellular transceiver and another relatively low-power transceiver operable to communicate with a remote user interface device. (As used herein, when a component is "operable to" perform a function, the component is configured to execute that function, i.e., is capable of performing or carrying out that function. Components that are "operably connected" to one another are in a relation such that a physical, mechanical and/or electronic activity in one can affect the operation of the other.) The portable communication device has a motion sensor to detect when the portable communication device is moving with respect to the earth. The remote user interface device also has a motion sensor to detect when the remote user interface device is moving with respect to the earth. As described in more detail below, the wireless communication link between the portable communication device and the remote user interface device is terminated when a determination is made that the portable communication device is moving and the remote user interface device is stationary. That determination may be made automatically by a processor in the portable communication device, or in the remote user interface device, or both.

For purposes of simplicity, the concepts may be described or understood in a scenario in which the portable communication device is a cellular phone and the remote user interface device is sometimes called a "car kit" or a "hands-free" interface or device, that installs in (or is built into) a motor vehicle and allows hands-free use of the cellular telephone by a user, such as the driver or a passenger. The remote user interface device is "remote" in the sense that it is typically not a unitary structure with the portable communication device, that it responds to wireless signals from the portable communication device, and/or that it may be under the control of the portable communication device. The remote user interface device may include functionality in addition to that described, such as Global Positioning System functionality. The portable communication device and the remote user interface may each include a power supply, which for simplicity may be described as a battery. Importantly, the concepts may be applicable to a scenario in which the power supply for the remote user interface is not independent of the motor vehicle, e.g., where a car kit is powered by a motor vehicle's battery. The portable communication device and the remote user interface device each include a motion sensor, which will for simplicity be described as an accelerometer. In general, the motion sensor generates an electrical signal as a function of (or based on) a position or a change in position or an acceleration (which are related to one another mathematically). For purposes of simplicity, it may be said that a motion sensor generates a motion signal as a function of motion with respect to the earth. In general, the motion signal indicates whether or not there is motion, and may also include information about the motion (e.g., its magnitude, direction, rate of change, etc.).

The portable communication device and the remote user interface device include control circuitry that (typically periodically) evaluates the signal from the respective motion sensor. One of those devices sends a message to the other device indicating whether the sending device is in motion. At least one of the devices, such as the device receiving that message, determines whether the remote user interface device is moving or not, and whether the portable communication device is moving or not. When the user has exited a parked vehicle, the remote user interface device is generally not moving but the portable communication device generally is moving. When at least one of the devices determines that the remote user interface device is not moving and that the portable communication device is moving, the wireless link between the portable communication device and the remote user interface device is terminated. The remote user interface device may also enter a power-conserving mode. A power-conserving mode can be any mode of operation that reduces power consumption. The remote user interface device may, for example, turn off completely or enter a standby mode until communication with a portable communication device occurs again.

Note that if both the portable communication device and the remote user interface device are in motion, it may be assumed that both devices are still being carried by the motor vehicle, and that motor vehicle is moving. Similarly, when both the cellular telephone and the remote user interface device have stopped moving, it may be assumed that the motor vehicle is stopped momentarily, such as at a traffic signal. If both devices are stationary for a predefined—and typically prolonged—period of time, such as two hours, such as when both are left in a parked vehicle, then the communication link may be disconnected and the remote user interface device may enter the power-conserving mode. (As used herein, a period of time in a method is "predefined" in the sense that it is typically set—expressly or inferentially—before the method begins. One example of a predefined period of time is a default period of time embedded within the software that controls the monitoring of the motion of the devices. Another example of a predefined period of time is a period of time selected by a user and stored in a memory element of one or both devices.)

Referring initially to a communication system 100 in FIG. 1, a wireless portable communication device 102, such as a cellular telephone, illustratively includes a housing 104 which may be any of several different types commonly used for cellular telephones and other portable electronic devices. A power supply, represented as a battery 106, is carried within the housing 104 for supplying power to the internal components. The battery 106 may be (for example) a replaceable or a rechargeable battery, which supplies power via a battery interface 108. The housing 104 contains circuitry (not all of which is shown in FIG. 1), which typically includes a processor 110, which may be embodied as a microprocessor that controls many of the functions of the portable communication device 102. The portable communication device 102 further includes one or more memory elements 112, which store data used by and instructions executed by the processor 110. The processor may receive user input from or provide user output to one or more user interfaces 114, such as a display, a keyboard, a touch pad, a touch screen, a button and the like. An audio input device, such as a microphone 116, and an audio output device, such as a speaker 118, may also be operably connected to the processor 110. Not all operable connections are depicted in FIG. 1.

In the example of FIG. 1, cellular telephone communications may be performed through a first, or cellular, transceiver 120, which includes a wireless signal receiver and a wireless signal transmitter that are connected to a first antenna 122. The first antenna 122 may be carried within the upper portion of the housing 104 for sending and receiving signals via a first wireless communication link 124 with a cellular telephone network 126. For example, the first transceiver 120 may transmit on a cellular band, e.g., 800-900 MHz, at cellular power levels, e.g., 0.2-0.6 watts.

The portable communication device 102 may also include a second transceiver 128 connected to a second antenna 130. The second transceiver 128 may comply with the Bluetooth® communication protocol stated in *Specification of the Bluetooth System, Master Table of Contents & Compliance Requirements*, Version 2.1, November 2005 and *Specification of the Bluetooth System, Profiles*, version 1.1, Feb. 22, 2001; both published by Bluetooth SIG, Inc. The second transceiver 128 may transmit at much lower power levels than the first transceiver 120. In general, the Bluetooth® communication protocol is intended for relatively short-range, e.g., 100-200 meters, wireless communication. Bluetooth® enabled devices operate around 2.4 GHz at one of number of different power levels, including a 0 dBm level transmit power (e.g., 1 milliwatt) in which the communication has a 10-meter range, and a 20 dBm transmit power (e.g., 100 milliwatts) which has a 100-meter range. This communication protocol is a multiple access system, which uses a frequency-hopped spread spectrum with time division duplex. The frequency hopping occurs at approximately 1600 hops/sec. Each Bluetooth® device has a unique 48-bit address. The second transceiver 128 wirelessly communicates with external devices which interface a user to the portable communication device 102. Although the present concepts are being described in the context of a cellular telephone and the Bluetooth® communication protocol, the concepts described herein can be used with other types of portable communication devices and other wireless user interface protocols, such as defined by IEEE standard 802.11. Further, the communication link may be a wireless communication link of any kind and any range, although a typical range may be less than 200 meters (some devices, for example have ranges of 100 meters or 10 meters). Beyond the short range of communication, the wireless communication link may not be reliable or sustainable or capable of being established. This wireless communication link is short-range in the sense that it is typically significantly shorter than the range of the first wireless communication link 124.

The second transceiver 128 communicates with a remote user interface device 132, such as an apparatus that allows hands-free use of a cellular telephone while the user is driving a motor vehicle. The remote user interface device 132 illustratively includes a housing 134 that contains or otherwise provides a framework for other components of the remote user interface device 132. As depicted in FIG. 1, the remote user interface device 132 may be powered by a battery 136 that may be independent of any other power source. The remote user interface device 132 further includes a remote transceiver 138 that is connected to a remote antenna 140. The remote transceiver 138 and remote antenna 140 are operable to communicate wirelessly, using the same communication protocol (e.g. Bluetooth®), to exchange signals via a second (short-range) communication link 142 with the second antenna 130 and the second transceiver 128 in the portable wireless communication device 102. A second processor 144 controls many of the functions of the remote user interface device 132. The remote user interface device 132 may also include one or more memory elements (not shown in FIG. 1) that store data or instructions for execution by the second processor 144. The second processor 144 may also be operably connected to one or more user interface elements (not shown in FIG. 1), such as a display, button, etc. The remote user interface device 132 may also include a microphone 146, and a speaker 148, through which a user may make or receive audible communication.

The wireless communication device 102 and the remote user interface device 132 may store control software for implementing the methods described herein. In addition, wireless communication device 102 and the remote user interface device 132 include motion sensors 150, 152. For purposes of simplicity, the motion sensors 150, 152 will be referred to as accelerometers, but accelerometers are examples of motion sensors and the disclosure is not limited to the use of accelerometers to detect motion. Further, the accelerometers 150, 152 can be any kind of devices that are responsive to position, change in position or acceleration including, but not limited to, microelectromechanical systems (MEMS) based accelerometers. The wireless communication device 102 includes a first accelerometer 150, which detects when the remote communication device is moving and produces a first motion signal that indicates whether or not motion is occurring. The motion signal may be generated continuously or in response to a request such as a polling request. Such motion can occur by a user carrying the communication device 102 while walking, for example, or by movement of an automobile in which that device is located. The first motion signal produced by the first accelerometer 150 in response to motion is provided as an input to the processor 110. As will be discussed below, the motion signal may be indicative of one or more characteristics of motion, including (but not necessarily limited to): whether a device is in a moving state or a non-moving state; whether a device has changed state (e.g., from moving to non-moving or vice versa); whether a motion has occurred that is significant; or any combination thereof.

The remote user interface device 132 comprises a second accelerometer 152, connected to the processor 144. The second accelerometer 152 produces a second motion signal indicating when the remote user interface device 132 is moving. When the remote user interface device 132 is fastened to a component within a motor vehicle, the second motion signal from the second accelerometer indicates movement when that vehicle is in motion. The accelerometers 150 and 152 may be, but need not be, of the same kind.

Figure 2:
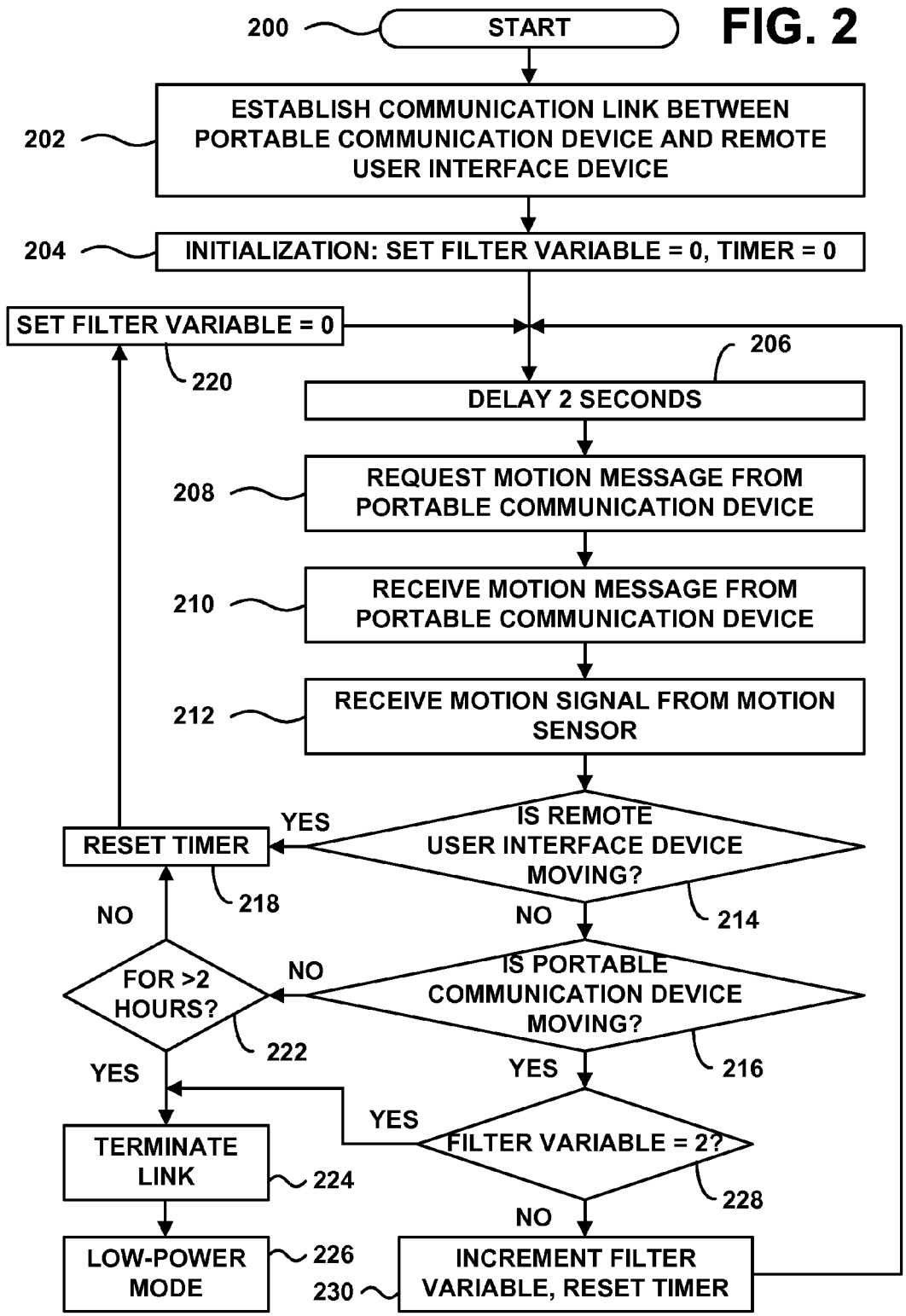
FIG. 2 is a flowchart of a process that may be carried out by a remote user interface device.

The two motion sensors, in this implementation accelerometers 150 and 152, are employed to determine when a user, who for purposes of illustration will be represented as the driver, has exited the motor vehicle and has taken the portable communication device 102 from the vehicle. An illustrative process for doing that may be carried out by the remote user interface device 132 (the process may be may be implemented in software and executed by processor 144) is depicted in FIG. 2. At the outset of the process (200), the remote user interface device 132 may be activated, such as by the driver manually turning on the remote user interface device 132. The transceiver 138 performs a procedure specified by the respective communication protocol, such as Bluetooth®, to establish the second communication link 142 with the portable communication device 102 (202). The processor 144 may perform some initialization (204), during which a variable, designated the "Filter Variable," and a software implemented timer are set to zero (as will be mentioned below, there may be two distinct timers, and both may be initialized). The functions of those elements will be described subsequently.

The process may include waiting for a delay period, that is, a predefined period of time (typically significantly shorter than the typically prolonged predefined period of time mentioned above), for example, two seconds (206). The timer is used to determine whether this delay period has elapsed or not. The effect of this two-second delay period is that subsequent loops of the process will occur at two-second intervals (other delay periods or no delay may be used, however). This delay period defines an interval at which a motion indication is periodically requested from the portable communication device 102. After delaying for the predefined period of time, the remote user interface device 132 sends a request message to the portable communication device 102 requesting motion information from the first accelerometer 150 (208).

At the portable communication device 102, the second antenna 130 and second transceiver 128 receive the request and convey the request to the processor 110. The processor 110 receives a motion signal from the accelerometer 150 which indicates whether the portable communication device 102 is moving. In a typical embodiment, the processor 110 may process the motion signal, to determine the validity of the motion signal. For example, the processor 110 may compare the motion signal to a threshold, and may determine that any motion having a magnitude below a particular threshold is insignificant or otherwise not a good indication of whether the portable communication device 102 (or the motor vehicle in which it is being carried) is moving. Such a threshold may include a default limit or a motion sensitivity setting selected by a user.

The portable communication device 102 transmits (via transceiver 128 and antenna 130) a motion message to the remote user interface device 132, which receives the motion message (210) via its own transceiver 138 and antenna 140. The motion message, which is a function of the motion signal from the accelerometer 150, indicates whether the portable communication device 102 is in motion. The motion message may comprise a binary "motion" or "no motion" indication. Alternatively, the motion message may carry a value indicating the intensity of any motion or the magnitude of acceleration of the portable communication device (which can provide an indication of whether the portable communication device 102 is in motion). In another variation, the motion message may include information about the direction of motion. In yet another variation, the motion message may carry a binary indication that the device has changed from a moving state to a non-moving state or vice versa. The concept is not limited to a motion message having any particular kind of indication with respect to any particular characteristic of motion.

After receiving the motion message, the remote user interface device 132 determines whether the remote user interface device 132 is in motion. The processor 144 of the remote user interface device 132 receives a motion signal from the accelerometer 152, which indicates whether the remote user interface device 132 is moving. The processor 144 may process this motion signal for validity (e.g., compare the motion signal from the accelerometer 152 to a threshold), although this processing is not depicted in FIG. 2. The processor 144 determines, as a function of the motion signal from its accelerometer 152, whether the remote user interface device 132 is moving (214). The processor 144 further determines, as a function of the motion messages received from the portable communication device 102, whether the portable communication device 102 is moving (216). When the processor 144 of the remote user interface device 132 determines that the remote user interface device is in motion, the timer keeping track of the delay period is reset to zero (218). The motion of the user interface device 132 may indicate that the vehicle itself is in motion, and while the vehicle is in motion, the second communication link 142 should remain established. (There may be circumstances under which the user interface device 132 is moving and the portable communication device 102 is not, and the relative movement of the devices 102, 132 causes a distance between them to grow, thereby causing the communication link 142 between them to be terminated because the devices are out of range. Termination of the link 142 due to the devices going out of range with one another is not explicitly depicted in FIG. 2.) The Filter Variable is reset to zero (220) and the process loops.

In the event the processor 144 determines that the remote user interface device 132 is not moving and that the portable communication device 102 likewise is not moving, the processor 144 determines whether the lack of motion of both devices 102, 132 has occurred for an extended period of time (222). The extended period of time is "extended" in the sense that it is generally substantially longer than other time periods used in the process. For purposes of illustration, the extended time period may be two hours, but this duration is not mandatory. Typical durations may be (for example) from ten minutes to four hours, and the duration of the extended period may, in some embodiments, be specified by a user. A second software implemented timer, distinct from the timer that keeps track of the delay period, may keep track of the extended period. This second timer, like the timer that keeps track of the delay period, may be reset when the processor 144 determines that the remote user interface device 132 is moving. This second timer may be started when the processor 144 determines that the remote user interface device 132 is not moving (assuming that this timer has not been started already). In the event that extended period of time has not elapsed, the delay period timer may be reset (218) (with the extended period timer not being reset unless the remote user interface device 132 is moving), the Filter Variable is reset (220) and the process loops. When the remote user interface device 132 and the portable communication device 102 are not moving, but the extended period of time has not elapsed, the lack of motion may be due to (for example) a temporary stoppage of traffic.

In the event the remote user interface device 132 and the portable communication device 102 are not moving and the extended period has elapsed, the processor 144 may terminate the communication link 142 (224). The processor 144 may terminate the communication link 142 itself or may transmit a request to the portable communication device 102 to terminate the communication link. After termination of the link, the processor 144 may cause the remote user interface device 132 automatically to enter a low-power mode (226), which may comprise (for example) the remote user interface device 132 turning off or entering a standby mode (in which some or all functionality is suspended and power consumption is thereby reduced) until communication with a portable communication device 102 occurs again.

In the event that the remote user interface device 132 is not moving but the portable communication device 102 is moving, it may be that the portable communication device 102 may have been removed from a stationary vehicle and is being carried by a user. The Filter Variable can help determine whether this is the case. In a simple implementation, the Filter Variable counts a number of loops, such as two loops. In the event that the remote user interface device 132 is not moving, and the portable communication device 102 is moving, and this has been the case for two consecutive loops, then the processor 144 may terminate the communication link 142 (224) and put the remote user interface device 132 into a low-power mode (226). Otherwise, the processor 144 may increment the Filter Variable and reset the delay timer (230), and the process loops. The selection of two loops for a Filter Variable is merely for purposes of illustration, and it should be noted that the Filter Variable is optional.

Many stages in the process depicted in FIG. 2, although being depicted as being carried out by the remote user interface device 132, may also be carried out by the portable communication device 102. In brief, the processor 110 of the portable communication device 102 may (after a delay period) determine (based upon a motion signal from accelerometer 150) whether the portable communication device 102 is moving, and may also determine whether the remote user interface device 132 is moving (based upon a motion message from the remote user interface device 132). When both devices 102, 132 are not in motion (i.e., are substantially stationary), and the lack of motion has persisted for an extended period of time, the processor 110 may terminate the communication link 142. Also, in an event the portable communication device 102 is moving but the remote user interface device 132 is not, the processor 110 may terminate the communication link 142. Upon termination of the communication link 142, the remote user interface device 132 may enter a low-power mode, and the portable communication device 102 may or may not enter a comparable low-power mode.

Figure 3:
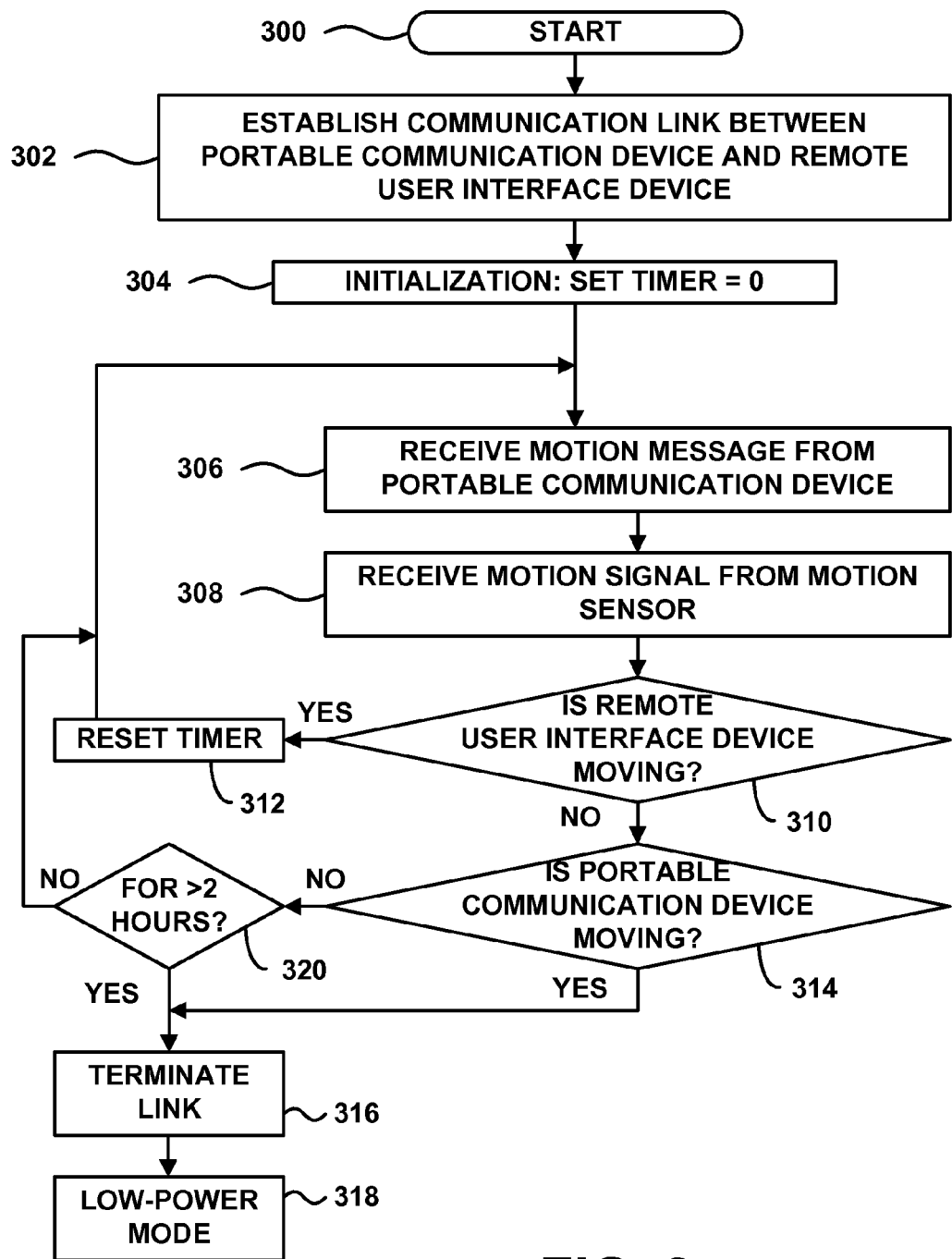
FIG. 3 is a flowchart of an alternative process that may be carried out by a remote user interface device.

Another implementation of the concepts is illustrated in the process shown in FIG. 3, which may be carried out by the processor 144 of the remote user interface device 132. At the outset of the process (300), the remote user interface device 132 may be activated and the second communication link 142 may be established (302), as described previously. A timer may be initialized (304), but in this illustration, the timer keeps track of the extended period rather than the delay period. (Techniques for management of the timer that keeps track of the extended period may be applied to the process shown in FIG. 2). In this variation, the remote user interface device 132 need not request a motion message from the portable communication device 102. Instead, the processor 110 in the portable communication device 102 may autonomously check the accelerometer 150 periodically (e.g., every two seconds) and send a motion message to the remote user interface device 132 whenever a change in motion (or motion state) occurs. The processor 110 may determine the validity of the motion signal from the accelerometer 150, as mentioned previously. The portable communication device 102 may also send a motion message to the remote user interface device 132 when no change in motion has occurred, or may send a motion message periodically, or may send a motion signal triggered by an event other than motion.

In the illustrative process shown in FIG. 3, the processor 144 of the remote user interface device 132 may be operable not to make any determinations about motion until a motion message is received from the portable communication device 102 (306). After receiving that motion message, however, the processor 144 receives a motion signal from the second accelerometer 152 (308) and determines whether the remote user interface device 132 is or is not moving (310), as described previously. If the remote user interface device 132 is moving, the timer keeping track of the extended period is reset to zero (312) and the process loops.

When the processor 144 determines, as a function of the motion signal from its accelerometer 152, that the remote user interface device 132 is not moving and the processor 144 further determines, as a function of the motion message received from the portable communication device 102, that the portable communication device 102 is moving (314), the processor 144 may terminate the communication link 142 (316) and may put the remote user interface device 132 into a low-power mode (318). When, however, both devices 102, 132 are stationary, the processor 144 may determine whether the extended period (e.g., two hours) has elapsed (320). In the event the extended period has not elapsed, the timer is not reset, but the process loops. In the event the extended period has elapsed, the processor 144 may terminate the communication link 142 (316) and may put the remote user interface device 132 into a low-power mode (318).

Many stages in the process depicted in FIG. 3, although being depicted as being carried out by the remote user interface device 132, may also be carried out by the portable communication device 102. In brief, the processor 110 of the portable communication device 102 may be operable not to make any determinations about motion until a motion message is received from the remote user interface device 132. When such a motion message is received, the processor 110 may determine (based upon a motion signal from accelerometer 150) whether the portable communication device 102 is moving, and may also determine whether the remote user interface device 132 is moving (based upon a motion message from the remote user interface device 132). The processor 110 may terminate (or may maintain) the communication link 142 based upon the motion (or lack of motion) of the devices 102, 132.

The processes described herein may be embodied as machine-readable instructions that may be cause a processor (such as processor 110 or processor 144) to carry out one or more functions. The instructions may be stored in one or more tangible and nontransient media, such as optical disk, magnetic tape, flash memory drive, and the like.

One or more embodiments of the described herein may result in one or more benefits, some of which have been discussed already. In addition to the convenience and power conservation that may be realized, one or more embodiments may be implemented flexibly on a wide range of portable communication devices and remote user interface devices. The portable communication devices and remote user interface devices may cooperatively operate even if they do not operate in exactly the same way (e.g., they may have different kinds of motion sensors). The circuitry and hardware useful for implementing the concepts (e.g., accelerometers) is relatively inexpensive, small and lightweight (size and weight are especially of interest when a device is a handheld device). One or more embodiments support tailoring processes to a user's own preferences, e.g., a user may set his/her own extended time period.

The foregoing description was primarily directed to a certain embodiments of the present concepts. Although some attention was given to various alternatives, it is anticipated that one skilled in the art will likely realize additional alternatives that are now apparent from the disclosure of these embodiments. For example, the order of some of the procedures depicted in FIGS. 2 and 3 may be unimportant, and some of the steps may be optional. Accordingly, the scope of the coverage should be determined from the following claims and not limited by the above disclosure. In the claims, terms such as "first," "second," "third" and the like are used to distinguish between repeated or comparable or like-named elements, and are not intended to impose any limitation of order, priority, or any temporal limitation.

What is claimed is:

1. A method executed by a processor in a remote user interface device, the remote user interface device comprising a motion sensor operably connected to the processor, the remote user interface device further having a wireless communication link with a portable communication device, the method comprising:

receiving a first motion message from the portable communication device, the first motion message indicating whether the portable communication device is in motion with respect to the earth;

receiving from the motion sensor a first motion signal, the first motion signal being a function of motion of the remote user interface device with respect to the earth;

determining, as a function of the first motion signal, that the remote user interface device is substantially stationary with respect to the earth;

determining, as a function of the first motion message, that the portable communication device is in motion with respect to the earth;

after a delay period, receiving a second motion message from the portable communication device, the second motion message indicating whether the portable communication device is in motion with respect to the earth;

after the delay period, receiving from the motion sensor a second motion signal, the second motion signal being a function of motion of the remote user interface device with respect to the earth;

determining that the remote user interface device is substantially stationary with respect to the earth as a function of the second motion signal;

determining that the portable communication device is in motion with respect to the earth as a function of the second motion message; and thereafter terminating the communication link.

2. The method of claim 1, further comprising, after terminating the communication link, entering a low-power mode.

3. A method executed by a processor in a remote user interface device, the remote user interface device comprising a motion sensor operably connected to the processor, the remote user interface device further having a wireless communication link with a portable communication device, the method comprising:

receiving a first motion message from the portable communication device, the motion message indicating whether the portable communication device is in motion with respect to the earth;

receiving from the motion sensor a first motion signal, the first motion signal being a function of motion of the remote user interface device with respect to the earth;

after an extended period of time of at least ten minutes, receiving a second motion message from the portable communication device, the second motion message indicating whether the portable communication device is in motion with respect to the earth;

after the extended period of time, receiving from the motion sensor a second motion signal, the second motion signal being a function of motion of the remote user interface device with respect to the earth;

determining that the portable communication device is substantially stationary with respect to the earth as a function of the first motion message and of the second motion message;

determining that the remote user interface device is substantially stationary with respect to the earth as a function of the first motion signal and of the second motion signal; and thereafter terminating the communication link.

4. The method of claim 1, wherein terminating the communication link comprises sending a request to the portable communication device to terminate the communication link.

\* \* \* \* \*